United States Patent
Batawi et al.

(10) Patent No.: US 6,916,569 B2
(45) Date of Patent: Jul. 12, 2005

(54) FUEL CELL COMPRISING A SOLID ELECTROLYTE LAYER

(75) Inventors: Emad Batawi, Winterthur (CH); Kaspar Honegger, Wallenwil (CH)

(73) Assignee: Sulzer Hexis AG, Winterthur (CH)

( * ) Notice: Subject to any disclaimer, the term of this patent is extended or adjusted under 35 U.S.C. 154(b) by 509 days.

(21) Appl. No.: 10/011,579

(22) Filed: Nov. 5, 2001

(65) Prior Publication Data

US 2002/0061429 A1 May 23, 2002

(30) Foreign Application Priority Data

Nov. 23, 2000 (EP) ............................................ 00811115

(51) Int. Cl.$^7$ ............................. H01M 8/10; H01M 2/08
(52) U.S. Cl. ............................ 429/30; 429/35; 429/36
(58) Field of Search ............................. 429/30, 32, 35, 429/36

(56) References Cited

U.S. PATENT DOCUMENTS

| | | | |
|---|---|---|---|
| 4,476,196 A | | 10/1984 | Poeppel et al. |
| 5,399,442 A | * | 3/1995 | Shundo ........................ 429/32 |
| 5,589,286 A | | 12/1996 | Iwata |
| 5,747,185 A | * | 5/1998 | Hsu ........................... 429/30 X |
| 5,851,689 A | * | 12/1998 | Chen ......................... 429/32 X |
| 6,344,290 B1 | * | 2/2002 | Bossel ....................... 429/32 X |
| 6,589,681 B1 | * | 7/2003 | Yamanis .................... 429/30 X |
| 6,677,069 B1 | * | 1/2004 | Piascik et al. ................ 429/32 |

FOREIGN PATENT DOCUMENTS

| | | |
|---|---|---|
| EP | 0722193 A1 | 7/1996 |
| EP | 0785587 A2 | 7/1997 |
| EP | 0788175 A1 | 8/1997 |
| JP | 01076671 | 3/1989 |
| JP | 06338336 | 12/1994 |
| WO | WO 98/35398 A1 | 8/1998 |

OTHER PUBLICATIONS

M. Dokiya, et al. "Wet Process for Planar SOFC" *Proceedings of the International Symposium on Solid Oxide Fuel Cells, Lu, Luxemburg, EEC*, vol. Symp.2, Jul. 2, 1991, pp. 127–134.

* cited by examiner

Primary Examiner—Stephen J. Kalafut
(74) Attorney, Agent, or Firm—Townsend and Townsend and Crew LLP

(57) ABSTRACT

A fuel cell having a solid electrolyte layer (12) forms together with two electrode layers (11, 13) a plate-like multiple layer system (1). The layers are applied by means of coating procedures to an open-pored, electrically conducting carrier structure (10) in the sequence anode (11), electrolyte (12) and cathode (13). This multiple layer system (1) has an outer edge which is exposed during a current generating operation of the fuel cell to an external environment (60) which contains molecular oxygen. The material of the carrier structure assumes an oxidized or a reduced state in thermodynamic equilibrium at the operating temperature of the fuel cell depending on the environment. The outer edge (16) of the multiple layer plate is covered over with an inert material. At the operating temperature of the fuel cell this edge covering (126) forms a barrier which inhibits or prevents the transport of molecular oxygen out of the external environment (60) into the carrier structure. The material is in particular YSZ, i.e. zirconium dioxide $ZrO_2$ which is stabilized with yttrium oxide $Y_2O_3$.

14 Claims, 2 Drawing Sheets

FUEL CELL COMPRISING A SOLID ELECTROLYTE LAYER

BACKGROUND OF THE INVENTION

The invention relates to a fuel cell comprising a solid electrolyte layer and to a battery comprising fuel cells of this kind.

High temperature fuel cells, the solid electrolyte of which is made in each case in the form of a thin layer as a part of a multiple layer plate, are known from EP-A-0 635 896 and EP-A-0 788 175. Thin-film electrolytes of this kind, which are 10–20 µm thick, can be applied to a carrier structure by means of a VPS process (Vacuum Plasma Spraying process). In addition to its mechanical function the carrier structure also has an electrochemical function as an electrode and an electrical function as a good conductor. In the so-called ASE cell (Anode Supported Electrolyte cell) the carrier structure is located on the side of the reducing fuel gas ($H_2$, CO), i.e. on the anode side. The carrier structure can be manufactured of metallic felt, porous metallic foam or metal mesh. A suggestion of profiling metal structures of this kind for the distribution of fuel at the same time had to be rejected since the pressure drop in the gas flow was too large and the distribution quality was insufficient. A further suggestion, namely to manufacture the carrier with a foam ceramic material, likewise led to fuel cells which did not fulfill the requirements.

In a further development of the ASE cells the following items must be observed. The carrier structure must be mechanically stable, so that the multiple layer plate of the ASE cell can be used as a self-supporting element and can be inserted as a separate component into a battery of fuel cells. The carrier structure must contain a communicating system of open pores, so that a gas exchange between the anode and a distributor system is possible without large concentration gradients. The multiple layer system of the ASE cell should have a thickness which is less than 1 mm as far as possible. Ageing processes, for example in the form of fissure developments, should take place as slowly as possible as a result of a suitable choice of materials.

SUMMARY OF THE INVENTION

An object of the invention is to create an ASE cell which satisfies the named requirements.

The fuel cell of the present invention comprises a solid electrolyte layer forms together with two electrode layers a plate-like multiple layer system. The layers are applied by means of coating procedures to an open-pored, electrically conducting carrier structure in the sequence anode, electrolyte and cathode. This multiple layer plate has an outer edge which is exposed during a current generating operation of the fuel cell to an external environment which contains molecular oxygen. The material of the carrier structure assumes an oxidized or a reduced state in thermodynamic equilibrium at the operating temperature of the fuel cell depending on the environment. The outer edge of the multiple layer plate is covered over with an inert material. At the operating temperature of the fuel cell this edge covering forms a barrier which inhibits or prevents the transport of molecular oxygen out of the external environment into the carrier structure. The material is in particular YSZ, i.e. zirconium dioxide $ZrO_2$ which is stabilized with yttrium oxide $Y_2O_3$.

The edge covering can be realized in two ways:
1) The material of the carrier structure, which is not resistant, is coated with the inert, i.e. resistant material, so that the carrier structure is protected by the coating.
2) The carrier structure is substituted by the inert material in a ring-shaped border zone. The first method is preferred, since the second is more complicated and expensive.

The invention will be explained in the following with reference to the drawings.

DESCRIPTION OF THE PREFERRED EMBODIMENTS

Figure 1:
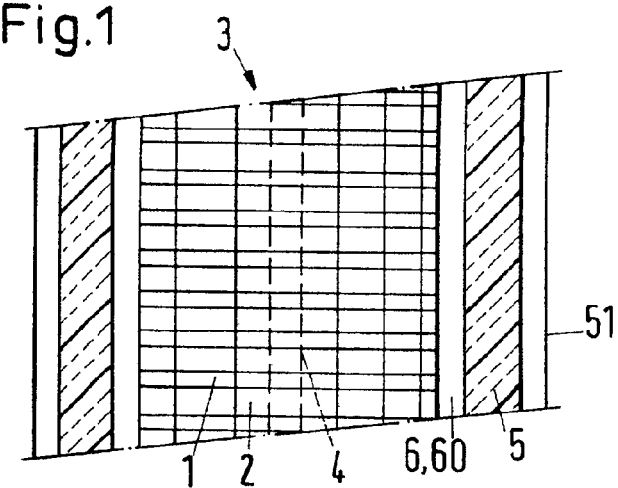
FIG. 1 is a section through a battery of fuel cells.

The battery which is schematically illustrated in FIG. 1 consists of a stack 3 of alternatingly arranged multiple layer plates 1 and interconnectors 2, which is shown in side view. The plates 1 are the electrochemically active constructional elements; the interconnectors 2 produce an electrical contact between adjacent cells. The interconnectors 2 are also formed as heat exchangers for preheating the gas flow which conducts oxygen; both of their surfaces carry a profiling which causes a largely uniform distribution of the oxidizing or reducing gas respectively over the multiple layer plate 1. The reducing gas is fed to the stack 3 via a central passage 4.

The cell stack 3 has in particular an axially symmetrical construction, which is for example circularly cylindrical or else prismatic. The stack 3 is surrounded by a heat insulating sleeve 5 and a ring space 6. Between an outer wall 51 and the sleeve 5 the oxidizing gas, i.e. the gas which contains the oxygen (as a rule ambient air), is distributed and is led through pores or passages into the ring space 6. In particular afterburner chambers in the form of vertical passages (not illustrated) are arranged in the latter. Inlet openings for the oxidizing gas are located between these passages at the surface of the cell stack 3. In another example of a fuel cell battery this gas is fed in through a large number of small tubes which radially traverse the ring space 6, which is formed as a single afterburner chamber.

Figure 2:
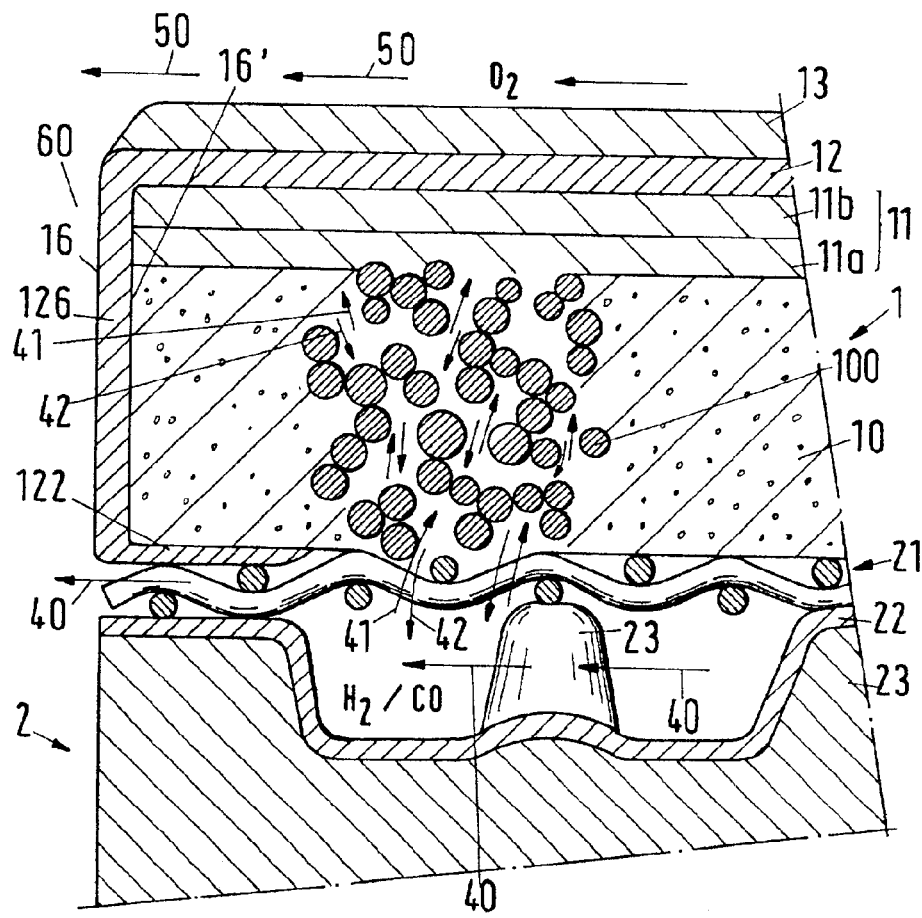
FIG. 2 is a cross-section through the edge of an ASE cell.

The fuel cell which is illustrated in FIG. 2 is or comprises a multiple layer plate 1. The latter consists of an open-pored carrier structure 10 of good electrical conductivity, a solid electrolyte layer 12 and two electrode layers 11 and 13. The layers are applied onto the carrier structure 10 by means of coating procedures in the sequence anode 11, electrolyte 12 and cathode 13. The carrier structure 10 is illustrated in a partial region as an aggregate of particles 100 which are sintered together (illustration not to scale). The anode 11 consists of two partial layers 11a and 11b, with the first partial layer 11a producing a transition from the porous carrier structure 10 to the partial layer 11b. The multiple layer plate 1 has an outer edge 16 which—during a current generating operation of the fuel cell—is exposed to an environment 60 containing oxygen. During the current generating operation the ring space 6 forms the environment 60 of the cells which contains oxygen.

The material of the carrier structure 10 assumes an oxidized or a reduced state in thermodynamic equilibrium at the operating temperature of the fuel cell depending on the environment. The carrier structure 10 is manufactured of the same material as or a material similar to that of the anode 11. This material is a cermet, i.e. a mixture of metal or metal oxide respectively and ceramic material. In particular the
} metal is Ni or the metal oxide is NiO respectively. Examples for the ceramic material are: YSZ, namely zirconium dioxide $ZrO_2$ which is stabilized with yttrium oxide $Y_2O_3$ (3 mol % or also 8 mol % of yttrium oxide), $Al_2O_3$, $TiO_2$, $MgAl_2O_4$, $LaCrO_3$ or doped $CeO_2$, which is doped with Gd oxide, Sm oxide, Ca oxide or Y oxide.

For a long lifetime of the fuel cell it is necessary that no microscopic fissures develop in the carrier structure 10 through density reductions which are connected with the transition from the oxidized to the reduced state. This should hold at least when the transition takes place homogeneously over the entire carrier structure 10.

In accordance with the invention an outer edge 16' of the carrier structure 10 is covered over by an inert material. At the operating temperature of the fuel cell the material of an edge covering 122, 126 of this kind forms a barrier which inhibits or prevents the transport of molecular oxygen out of the external environment 60 into the carrier structure. In the example of FIG. 2 the electrolyte layer 12 and the edge covering 122, 126 are produced using a single material—advantageously YSZ, with the latter forming a connected coating. The edge covering consists of a covering 126 of the outer edge 16' of the carrier structure 10 and of a covering 122 on the lateral surface of the carrier structure 10, which is limited to an edge zone in which no chemical processes take place in the current generating operation.

Since the electrolyte layer 12 and the edge covering 122, 126 have different functions, it is more advantageous for the coatings to be applied separately in two steps. For the edge covering 122, 126, a material which is different from that for the electrolyte layer 12 can be chosen, namely in addition to YSZ, for example $TiO_2$, $Al_2O_3$, $MgAl_2O_4$, $LaCrO_3$ or a mixture of these substances.

If the edge covering 122, 126 in accordance with the invention is lacking, oxygen diffuses out of the ring space 6 into the porous carrier structure 10. An oxidized boundary zone forms. Between this boundary zone and the reduced inner region there result mechanical stresses, since the density of the material has increased in the boundary zone. The oxygen produces not only the oxidized boundary zone, but also reacts with the reducing gas, which likewise diffuses into the boundary zone from the inside. The liberated reaction heat produces local temperature increases. The mechanical stresses and the local temperature increases have a detrimental effect: Fissures develop which are directed tangentially. As a result of the fissures the material becomes detached from the edge of the multiple layer plate 1. This decay process propagates further radially until the fuel cell finally no longer functions. The edge covering 126 at least partly suppresses the oxygen transport into the carrier structure 10. If the edge covering 122, 126 is sufficiently thick, then the described decay does not occur.

In FIG. 2 a part of the interconnector 2 is also shown at its anode side. The anode side and the cathode side carry a profiling with pegs 23 which produce an electrical connection to the multiple layer plate 1. For improving the electrical contact between the carrier structure 10 and the interconnector 2, a wire mesh 21 is inserted between the two. The metallic interconnector 2 is coated: on the anode side with a contact layer 22 of Ni, on the non-illustrated cathode side with a protective layer which prevents a passing through of chromium oxide, and likewise with a contact layer (cf. EP-A-0 974 564).

The flow of the fuel gas containing $H_2$ and CO is indicated by arrows 40. The arrows 41 and 42 symbolize the diffusion of these reactive substances to the anode 11 and the diffusion of the reaction products $H_2O$ and $CO_2$ in the reverse direction respectively. The gas flow which contains $O_2$ and which moves over the cathode 13 is indicated by the arrows 50.

In the oxidized state the carrier structure 10 advantageously has a porosity, the value of which lies in the range between 20 and 35%. The pore diameters have values which are largely distributed over a range from 1 to 10 $\mu$m. The porosity can be influenced and set through addition of carbon or another material which can be burned out. The thickness of the carrier structure 10 is greater than 0.3 mm and less than 1.2 mm depending on the manufacturing process. Tape casting and slip casting come under consideration as manufacturing procedures. The first procedure yields thicknesses of 0.3 to 0.5 mm, the second of 0.8 to 1.5 mm. For example in a mixture of 56% by weight NiO and 44% by weight of YSZ one obtains a carrier structure 10 with a porosity of 27%. Through the reduction of the NiO to Ni the porosity increases to 41.5% (with 50% by weight of Ni and 50% by weight of YSZ).

The edge covering 122, 126 can be applied by means of spraying on of a slurry-like material, immersion into a material of this kind, transfer of slurry using intermediate carriers (tampon, roller) or silk screen printing. In a process using airbrush spraying the slurry is sprayed onto a masked reverse side of the substrate, i.e. of the carrier structure 10, and its outer edge. In this the front side is already coated with the anode 11 and the electrolyte 12. In the dip coat process the substrate 10 is immersed into a slurry bath up to a desired border width and is moved at the same time through rotation in such a manner that it is coated over its entire periphery. In a process using a roller the slurry can be taken up continuously by the roller from a bath and transferred from the latter to the substrate 10.

Figure 3:
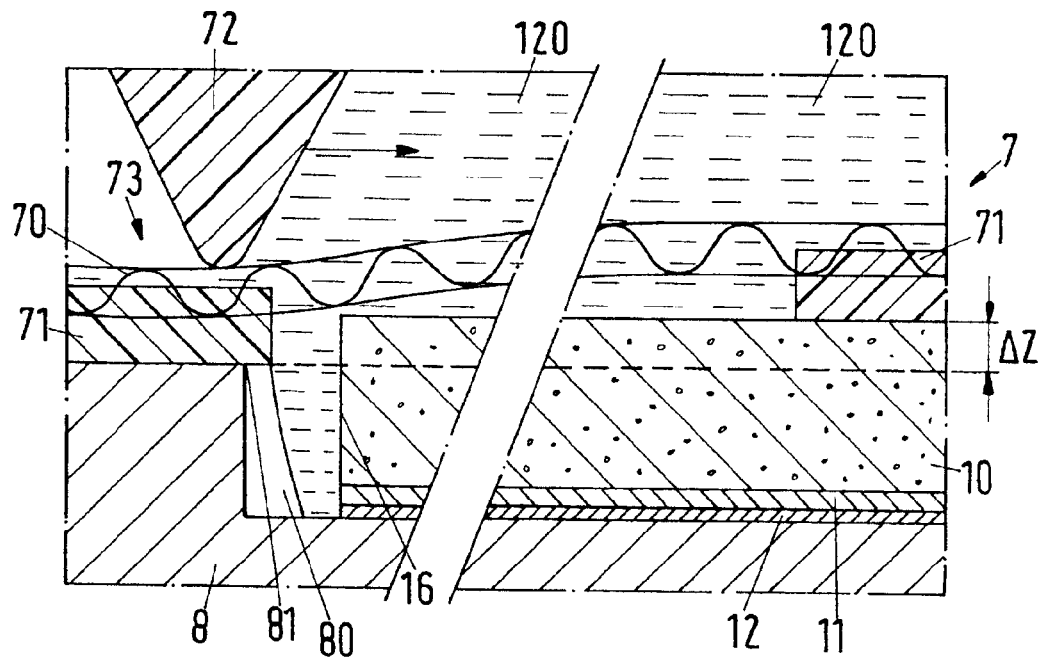
FIG. 3 illustrates a silk screen printing process by means of which a coating is applied to a carrier structure.

It is illustrated in FIG. 3 how the protective material for the edge covering 122, 126 can be applied to the carrier structure 10 by means of a silk screen printing process. In this process both parts 122 and 126 of the edge covering are applied simultaneously with one apparatus 7—forming a connected coating. A film of a slurry or of a paste 120 can be applied to the carrier structure 10 with the apparatus 7, which comprises a template with gauze 70 (or sieve) and covering films 71 as well as a wiper 72. In this the carrier structure 10, the substrate of the coating process, is laid into a depression 80 of a substrate holder 8. A window 73 through the covering films 71 which is left free for a passing through of paste is chosen so large that paste 120 can flow off over the edge 16' of the carrier structure 10 at the edge of the window 73. In order that this actually takes place, the substrate 10 must project sufficiently beyond the edge 81 of the depression 80: the height difference $\Delta z$ must be greater than about 0.2 mm. If $\Delta z$ is less than about 0.05, then a coating arises only at the locations where the gauze 70 is brought directly into contact with the substrate 10 through the wiper movement. From the paste 120 which adheres at the edge 16' and the edge zone 122' there arises through a sintering (after a drying of the paste) an edge covering which forms a coating which is separate from the electrolyte layer 12—in contrast to the edge covering 122, 126 of the embodiment in accordance with FIG. 2.

Figure 4:
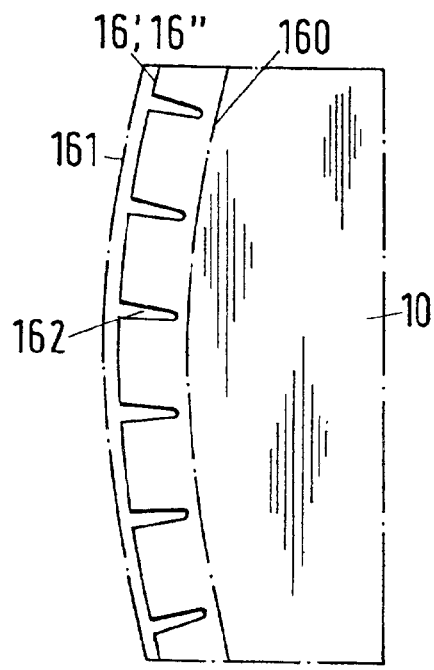
FIG. 4 shows the edge of a particular carrier structure.

The outer edge 16' of the carrier structure 10 is circular in a simple embodiment. It can also have the shape of a curve 16" lying between two concentric circles 160, 161, with this boundary curve 16" having for example a periodic pattern along the periphery: see FIG. 4. The boundary curve 16" can have radially directed indentations, grooves or cleavages 162 which are at least partly filled by the paste 120. The boundary curve 16' can also (not illustrated) comprise apertures, which for example form a fringe of regularly arranged holes.

What is claimed is:

1. Fuel cell comprising a solid electrolyte layer (12) and two electrode layers (11, 13) which are applied by means of coating procedures to an open pored, electrically conducting carrier structure (10) in the sequence anode (11), electrolyte (12) and cathode (13) and form a plate-like multiple layer system (1), with this multiple layer plate (1) having an outer edge which is exposed during a current generating operation of the fuel cell to an external environment (60) which contains molecular oxygen and with the material of the carrier structure assuming an oxidized or a reduced state in thermodynamical equilibrium at the operating temperature of the fuel cell depending on the environment, characterized in that the outer edge (16) of the multiple layer plate is covered over with an inert material; and in that this edge covering (122, 126) forms at the operating temperature of the fuel cell a barrier which inhibits or prevents the transport of molecular oxygen out of the external environment (60) into the carrier structure, with the inert material of the edge covering being zirconium dioxide $ZrO_2$ which is stabilized with yttrium oxide $Y_2O_3$.

2. Fuel cell in accordance with claim 1, characterized by a carrier structure (10) which permits a transition from the oxidized into the reduced state, in which in spite of a density reduction no macroscopic fissures develop as long as the transition takes place homogeneously over the entire carrier structure.

3. Fuel cell in accordance with claim 1, characterized by a carrier structure (10) which is manufactured of the same material as that of the anode (11), with the material being a mixture of metal or metal oxide respectively and ceramic material, and with the metal being Ni or the metal oxide being NiO respectively and with the ceramic material being one of the following substances or a mixture of these substances: YSZ, $Al_2O_3$, $TiO_2$, $MgAl_2O_4$, $LaCrO_3$ or doped $CeO_2$, which is doped with Gd oxide, Sm oxide, Ca oxide or Y oxide.

4. Fuel cell in accordance with claim 1, characterized by a carrier structure (10), the porosity of which has a value in the range between 20 and 35% in the oxidized state, the pore diameters of which have values which are largely distributed over a range from 1 to 10 $\mu$m, the thickness of which is greater than 0.3 mm and less than 1.2 mm.

5. Fuel cell in accordance with claim 1, characterized in that the edge covering (122, 126) is applied by means of spraying on of a slurry-like material, immersion into a material of this kind, transfer of the material with intermediate carriers or silk screen printing.

6. Fuel cell in accordance with claim 5, characterized in that the electrolyte layer (12) and the edge covering (122, 126) are applied using a single material forming a connected layer; or in that the electrolyte layer (12) and the edge covering (122, 126) are each applied in a separate layer, with the material for the edge covering being YSZ, $TiO_2$, $Al_2O_3$, $MgAl_2O_4$, $LaCrO_3$ or a mixture of these substances.

7. Fuel cell in accordance with claim 1, characterized in that the outer edge (16') of the carrier structure (10) has the shape of a circle or a curve (16") lying between two concentric circles (160, 161), with this boundary curve (16") having a periodic pattern along the periphery, for example radially directed indentations, grooves or clefts (162), or comprises a fringe of apertures which are at least partly filled by the material of the edge covering.

8. Fuel cell in accordance with claim 1, characterized in that the carrier structure (10) is covered over on a lateral surface (122') by the edge covering, with the lateral surface extending parallel to the layers of the multiple layer system (1) and the edge covering (122) being restricted to a boundary zone in which no electrochemical processes take place in the current generating operation.

9. Battery with fuel cells in accordance with claim 1, characterized in that the multiple layer plates (1) and interconnectors (2) are put together in an alternating arrangement to form a stack of cells (3); in that a ring space (6) with one or more afterburner chambers is provided at the lateral surface of the cell stack; and in that the ring space forms the environment (60) of the cell containing the oxygen during a current generating operation.

10. Fuel cell comprising a solid electrolyte layer and first and second electrode layers coated onto an open-pored, electrically conducting carrier structure in the sequence anode, electrolyte and cathode to form a multiple layer plate which has an outer edge which is exposed during a current generating operation of the fuel cell to an external environment that includes molecular oxygen, the material of the carrier structure assuming an oxidized or a reduced state in thermodynamic equilibrium at the operating temperature of the fuel cell, the outer edge of the multiple layer plate being coated by an inert material that forms at an operating temperature of the fuel cell a barrier inhibiting transportation of molecular oxygen from the external environment into the carrier structure.

11. Fuel cell in accordance with claim 10, wherein the inert material covering the outer edge comprises zirconium dioxide $ZrO_2$ which is stabilized with yttrium oxide $Y_2O_3$.

12. Fuel cell in accordance with claim 10, wherein the carrier structure is manufactured of the same material as that of the anode and comprises a mixture of one of metal and metal oxide and a ceramic material.

13. Fuel cell in accordance with claim 10, wherein the electrolyte layer and the edge covering are one of applied using a single material forming a connected layer and applied as separate layers.

14. Fuel cell in accordance with claim 10, wherein the outer edge of the carrier structure has a shape of one of a circle and a curve lying between two concentric circles.

* * * * *